(12) United States Patent (10) Patent No.: US 9,124,397 B2
Lee et al. (45) Date of Patent: Sep. 1, 2015

(54) WIRELESS COMMUNICATION SYSTEM WITH INTERFERENCE MITIGATION MECHANISM AND METHOD OF OPERATION THEREOF

(71) Applicant: Samsung Electronics Co., Ltd., Gyeonggi-Do (KR)

(72) Inventors: Jungwon Lee, San Diego, CA (US); Jung Hyun Bae, San Diego, CA (US); Yingqun Yu, San Diego, CA (US); Tiangao Gou, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 154 days.

(21) Appl. No.: 13/886,294

(22) Filed: May 3, 2013

(65) Prior Publication Data

US 2014/0274092 A1 Sep. 18, 2014

Related U.S. Application Data

(60) Provisional application No. 61/789,418, filed on Mar. 15, 2013.

(51) Int. Cl.
*H04W 72/00* (2009.01)
*H04L 5/00* (2006.01)
*H04B 1/10* (2006.01)

(52) U.S. Cl.
CPC ............... *H04L 5/0051* (2013.01); *H04B 1/10* (2013.01); *H04B 1/1027* (2013.01); *H04L 5/00* (2013.01); *H04L 5/0073* (2013.01)

(58) Field of Classification Search
CPC ..... H04L 5/0051; H04L 5/0073; H04B 1/1027
USPC ............... 455/452.1, 296, 63.1, 71, 561, 501, 455/114.2
See application file for complete search history.

(56) References Cited

U.S. PATENT DOCUMENTS

| 8,014,326 | B2 | 9/2011 | Sahinoglu et al. | |
|---|---|---|---|---|
| 8,145,133 | B2 | 3/2012 | Cho et al. | |
| 2002/0160814 | A1* | 10/2002 | Miya | 455/562 |
| 2004/0058713 | A1* | 3/2004 | Hayashi | 455/562.1 |
| 2010/0304753 | A1* | 12/2010 | Furuya | 455/450 |

(Continued)

FOREIGN PATENT DOCUMENTS

| EP | 1947782 B1 | 5/2009 |
|---|---|---|
| JP | 2013501416 A | 1/2013 |
| KR | 1020080041323 A | 5/2008 |

OTHER PUBLICATIONS

Francois Baccelli: Interference Networks with point to point codes. IEEE, May 2011.*

(Continued)

*Primary Examiner* — Wesley Kim
*Assistant Examiner* — Md Talukder
(74) *Attorney, Agent, or Firm* — IP Investment Law Group

(57) ABSTRACT

A wireless communication system includes: a communication interface configured to receive a desired input signal and an interference input signal; and a control module, coupled to the communication interface, configured to calculate a capacity region to maximize a first R1 reference for the desired input signal by removing the interference input signal.

20 Claims, 5 Drawing Sheets

(56) References Cited

U.S. PATENT DOCUMENTS

2010/0309861 A1* 12/2010 Gorokhov et al. ............ 370/329
2011/0003608 A1* 1/2011 Forenza et al. ............... 455/501
2011/0312275 A1* 12/2011 Canpolat et al. ............. 455/63.1
2013/0155967 A1* 6/2013 Kang et al. ................... 370/329
2014/0274092 A1* 9/2014 Lee et al. .................... 455/452.1

OTHER PUBLICATIONS

Jungwon Lee: Interference Mitigation via joint detection. IEEE, Jun. 2011.*

Baccelli, F., Gamal, A.E., and Tse, D. N. C., "Interference networks with point-to-point codes," IEEE Trans. Inf. Theory, vol. 57, pp. 2582-2596, May 2011.

Lee, J. Toumpakaris, D., and Yu, W., "Interference mitigation via joint detection," IEEE J. Select. Areas in Commun., vol. 29, pp. 1172-1184, May 2011.

Blomer, J. and Jindal, N., "Transmission capacity of wireless ad hoc networks: Succesive interference cancellation vs, joint detection," in Proc. IEEE Int. Conf. on Commun., 2009.

* cited by examiner

WIRELESS COMMUNICATION SYSTEM WITH INTERFERENCE MITIGATION MECHANISM AND METHOD OF OPERATION THEREOF

CROSS-REFERENCE TO RELATED APPLICATION(S)

This application claims the benefit of U.S. Provisional Patent Application Ser. No. 61/789,418 filed Mar. 15, 2013, and the subject matter thereof is incorporated herein by reference thereto.

TECHNICAL FIELD

An embodiment of the present invention relates generally to a wireless communication system, and more particularly to a system for optimizing interference mitigation for wireless communication.

BACKGROUND

Wireless communication systems typically employ one or more modulation schemes to communicate voice, data, and control information between the base station and a mobile terminal. A wireless communication system can be global system for mobile-communication (GSM). The Enhanced Rates for GSM Evolution (EDGE) has been defined as a transitional standard between second generation (2G) and third generation (3G) wireless standards, but their problems can also impact fourth generation (4G) standards, long term evolution (LTE), or high speed packet access (HSPA). The communication sequences must be decoded from frequency transmissions.

In cellular mobile communications systems like GSM/EDGE, co-channel interference (CCI) from cells using the same frequencies at the considered cell is an important capacity limiting factor. Since there are a limited number of available carriers, a more aggressive frequency reuse pattern has to be applied to augment the achievable throughput. The capacity of the system becomes interference-limited.

In such conditions, capacity increases can be obtained by enhanced algorithms in the mobile terminals, which are capable of operating in a more hostile interference scenario. This has brought new interests in interference cancellation techniques in mobile terminals. Efficient interference suppression can be achieved by multiple receive antennas, but due to the compact design of the modern mobile terminals and cost considerations, implementation can be inefficient or too large to include in a personal electronic device, such as a cellular telephone or personal digital assistant.

Thus, a need still remains for a wireless communication system with interference mitigation mechanism to reduce the complexity of managing the error rate caused by an interference channel. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a wireless communication system including: a communication interface configured to receive a desired input signal and an interference input signal; and a control module, coupled to the communication interface, configured to calculate a capacity region to maximize a first R1 reference for the desired input signal by removing the interference input signal.

An embodiment of the present invention provides a method of operation of a wireless communication system including: receiving a desired input signal and an interference input signal; and calculating a capacity region for maximizing a first R1 reference of the desired input signal by removing the interference input signal.

An embodiment of the present invention provides a wireless communication system, including: a communication interface configured to receive a desired input signal from a base station and an interference input signal from a second base station; and a control module, coupled to the communication interface, configured to calculate a capacity region to maximize a first R1 reference for the desired input signal by removing the interference input signal wherein the control module is configured to calculate an interference range, a successive interference cancellation (SIC) range, and a joint decode range.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
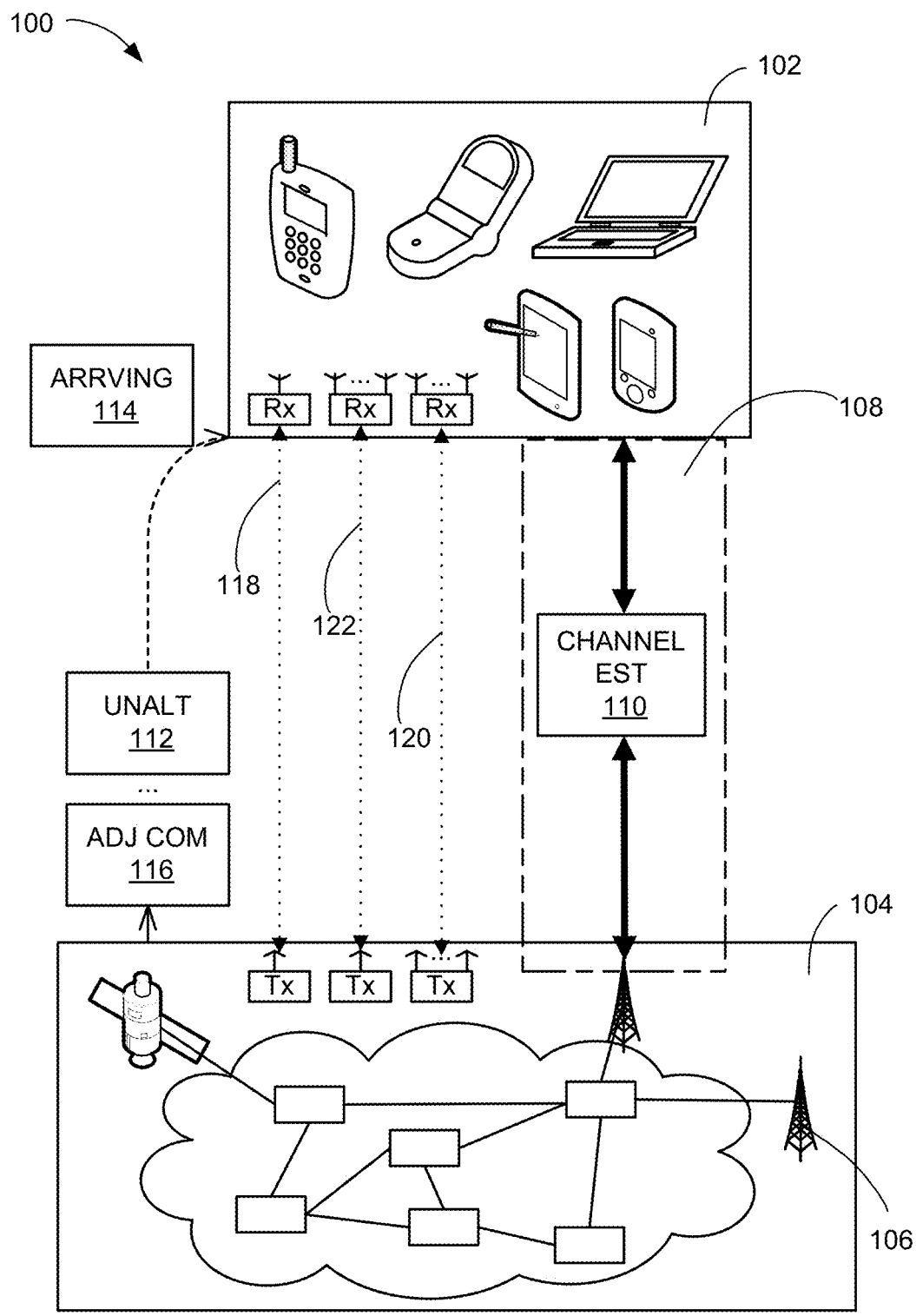
FIG. 1 is a wireless communication system with interference mitigation mechanism in an embodiment of the present invention.

The embodiment of the present invention provides a system and method for wireless communications system that employs one or more modulation schemes to communicate voice, data, and control information between the base station and a mobile terminal. A range of modulation can be represented by a capacity region based on the point-to-point code rate-error relationship. The capacity region can be defined by the second inflection point and the first inflection point, which identify the boundary between the achievable frequency ranges and those that are not achievable within the target block error rate (BLER). The calculation of the second inflection point and the first inflection point, by the control module, for any of the capacity region can be performed by calculating only three of the points of interest with the use of a look-up table having only two parameters. The calculations of any three of the first R1 reference, the second R1 reference, the first R2 reference, and the second R2 reference, representing the point-to-point code rate-error boundary, can be performed in real time and do not require any update that is normal with a look-up table.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "point-to-point codes" referred to herein are a system of message exchange sequences used to optimize the use of communication bandwidth. The point-to-point codes can include for example capacity achieving codes that do not use message splitting.

Referring now to FIG. 1, therein is shown a wireless communication system 100 with interference cancellation mechanism in an embodiment of the present invention. The wireless communication system 100 includes a mobile device 102, such as a cellular phone or a notebook computer, connected to a network 104. The network 104 is defined as a system of wired or wireless communication devices that are connected to each other for enabling communication between devices.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The network 104 can include a base station 106 for directly linking and communicating with the mobile device 102. The base station 106 can receive wireless signals from the mobile device 102, transmit signals to the mobile device 102, process signals, or a combination thereof. The base station 106 can also relay signals between other base stations, components within the network 104, or a combination thereof.

The mobile device 102 can be connected to the network 104 through the base station 106. For example, the base station 106 can include or be with a cell tower, a wireless router, an antenna, a processing device, or a combination thereof being used to send signals to or receive signals from the mobile device 102, such as a smart phone or a laptop computer. The mobile device 102 can connect to and communicate with other devices, such as other mobile devices, servers, computers, telephones, or a combination thereof.

The base station 106 can be used to wirelessly exchange signals for communication, including voice signals of a telephone call or data representing a website and interactions therewith. The base station 106 can also transmit reference signals, training signals, error detection signals, error correction signals, header information, transmission format, protocol information, or a combination thereof.

Based on the communication method, such as global system for mobile-communication (GSM), Enhanced Rates for GSM Evolution (EDGE), second generation (2G), third generation (3G), fourth generation (4G) standards, long term evolution (LTE) or high speed packet access (HSPA), the communication signals can include reference portions, header portions, format portions, error correction or detection portion, or a combination thereof imbedded in the communicated information. The reference portions, header portions, format portions error correction or detection portion, or a combination thereof can include a predetermined bit, pulse, wave, symbol, or a combination thereof. The various portions can be embedded within the communicated signals at regular time intervals, frequency, code, or a combination thereof.

The mobile device 102 can communicate with the base station 106 through a channel 108. The channel 108 can be wireless, wired, or a combination thereof. The channel 108 can be a direct link between the mobile device 102 and the base station 106 or can include repeaters, amplifiers, or a combination thereof. For example, the channel 108 can include communication frequency, time slot, packet designation, transmission rate, channel code, or a combination thereof used for transmitting signals between the mobile device 102 and the base station 106.

The channel 108 and the effects thereof can be represented by a channel estimate 110. The channel estimate 110 is defined as a description of changes to signals caused by the channel 108. The channel estimate 110 can described to quantize reflection, loss, refraction, obstructions, or a combination thereof that a signal can experience while traversing between the base station 106 and the mobile device 102. The channel estimate 110 can further characterize interference that the mobile device 102 can experience from other transmitters, such as other mobile devices or other base stations, or from the movement of the mobile device 102.

For example, the base station 106 can transmit an desired input signal 112, such as the desired input to the mobile device 102. The desired input signal 112 can change while traversing through the channel 108 due to the qualities therein, such as from delayed signal reflections from various buildings, from interferences other nearby transmitting sources, from the Doppler Effect experienced when the mobile device 102 is in transit, or a combination thereof. The mobile device 102 can receive an arriving communication 114, which is the desired input signal 112 that has been changed due to qualities of the channel 108.

The mobile device 102 can determine the channel estimate 110 from the arriving communication 114. For example, the mobile device 102 can compare the information in the reference or training portion to the standardized or intended information in the reference or training portion to estimate the channel estimate 110.

The wireless communication system 100 can employ link adaptation methods for controlling the communication between devices. Link adaptation method can have the mobile device 102 feedback and report information associated with the channel 108 to the base station 106. The base station 106 can use the feedback information to adjust various aspects of the communication with the mobile device 102.

The wireless communication system 100 employing link adaptation method can inherently have a delay between characterizing the channel 108 based on a communication, feeding information back to the base station 106, and making the adjustment based on the communication. The delay can cause the adjustments to be incorrect due to changes in the channel 108 during the delay.

For example, the mobile device 102 can characterize the channel 108 based on the arriving communication 114 corresponding to the desired input signal 112. The characterization of the channel 108 will represent the channel estimate 110 at the time of receiving the arriving communication 114. The channel 108 can change during the time necessary to determine the channel estimate 110, send feedback information to the base station 106, and have the base station 106 make adjustments accordingly. Hence, the adjustments made based on the arriving communication 114 may not be relevant due to changes in the channel 108 at the time of transmitting an adjusted communication 116.

For illustrative purposes, the base station 106 will be described as transmitting signals and the mobile device 102 as receiving and replying to the transmitted signals. However, it is understood that both the mobile device 102 and the base station 106 can each transmit and receive signals.

Also for illustrative purposes, the wireless communication system 100 will be described as employing a single-input single-output (SISO) scheme 108 for communicating with one antenna on the transmitter and one antenna on the receiver. However, it is understood that the wireless communication system 100 can employ a multiple-input multiple-output (MIMO) scheme 118 including a single-input multiple-output (SIMO) scheme 120 and a multiple-input single-output (MISO) scheme 122. The multiple-input multiple-output scheme 118 can have one or more antennas on the transmitter end, at the base station 106, communicating with one or more antennas on the receiver end, at the mobile device 102.

The multiple-input multiple-output scheme 118 can include the single-input multiple-output scheme 120 having a single antenna at the base station 106 communicating with multiple antennas on the mobile device 102. The multiple-input multiple-output scheme 118 can further include the multiple-input single-output scheme 122 having multiple antennas at the base station 106 communicating with a single antenna on the mobile device 102.

For further illustrative purposes, the mobile device 102 will be described as directly communicating with the base station 106. However, it is understood that the mobile device 102 can communicate with the base station 106 through other devices, such as a repeater, another mobile device, a router, or a combination thereof. It is also understood that the mobile device 102 can access the network 104 through devices other than the base station 106.

Figure 2:
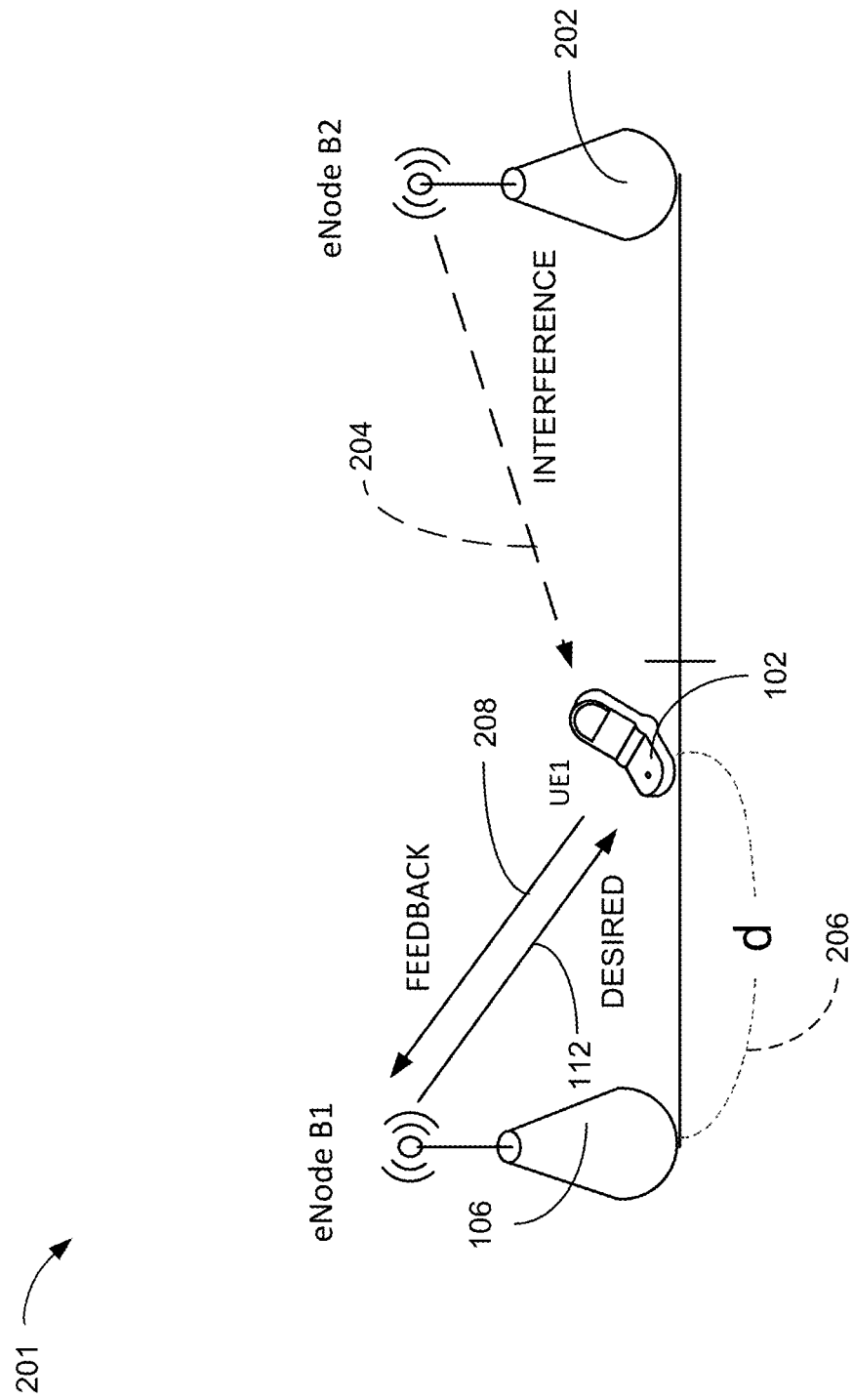
FIG. 2 is a system diagram of an application of the wireless communication system of FIG. 1.

Referring now to FIG. 2, therein is shown a system diagram of the wireless communication system 100 of FIG. 1. The functional block diagram of the wireless communication system 100 depicts, as an example, the mobile device 102 receiving the desired input signal 112 from the base station 106, such as an eNode B, a wireless base station, a communication transceiver, or a wireless hot spot. The mobile device 102 is depicted as a cell phone, as an example. An alternative base station 202 can transmit the interference input signal 204 that is received by the mobile device 102. As the mobile device 102 moves toward the alternative base station 202 the strength of the desired input signal 112 can be reduced in amplitude as a function of a distance 206 from the base station 106, while the interference input signal 204 is increasing.

The base station 106 can communicate with the mobile device 102 by point-to-point codes. The interference input signal 204 from the alternative base station 202 can be identified through communication between the base station 106 and the alternative base station 202. The identification of the interference input signal 204 can allow the elimination of the interference within the mobile device 102. The base station 106 can communicate with the mobile device 102 in order to transfer the point-to-point codes and the mobile device 102 can respond to the base station 106 through a feedback 208. The feedback 208 can be a message path from the mobile device 102 to the base station 106 for the purpose of adjusting the frequency of subsequent transmissions in order to improve the block error rate of those transmissions. The exchange between the base station 106 and the mobile device 102 can identify the interference frequencies from the alternative base station 202. Once identified, the interference frequencies from the alternative base station 202 can be eliminated by the mobile device 102.

It has been discovered that the wireless communication system 100 can provide an interference mitigation mechanism for diminishing the interference input signal 204 within the mobile device 102. The mobile device 102 can communicate with the base station 106 through the feedback 208 in order to identify the optimum frequency range to transmit the point-to-point codes. The exchange between the desired input signal 112 and the feedback 208 provides the mobile device 102 with detailed information on the interference input signal 204 required to filter the interference between the base station 106 and the alternative base station 202 and provides a higher probability that the communication flow will not be interrupted. When a transition from the base station 106 to the alternative base station 202 occurs, the mobile device 102 will be much closer to the alternative base station 202 and the user equipment will receive a stronger signal. This is primarily due to the fact that the amplitude of the desired input signal 112 is inversely proportional to the distance 206 squared.

Figure 3:
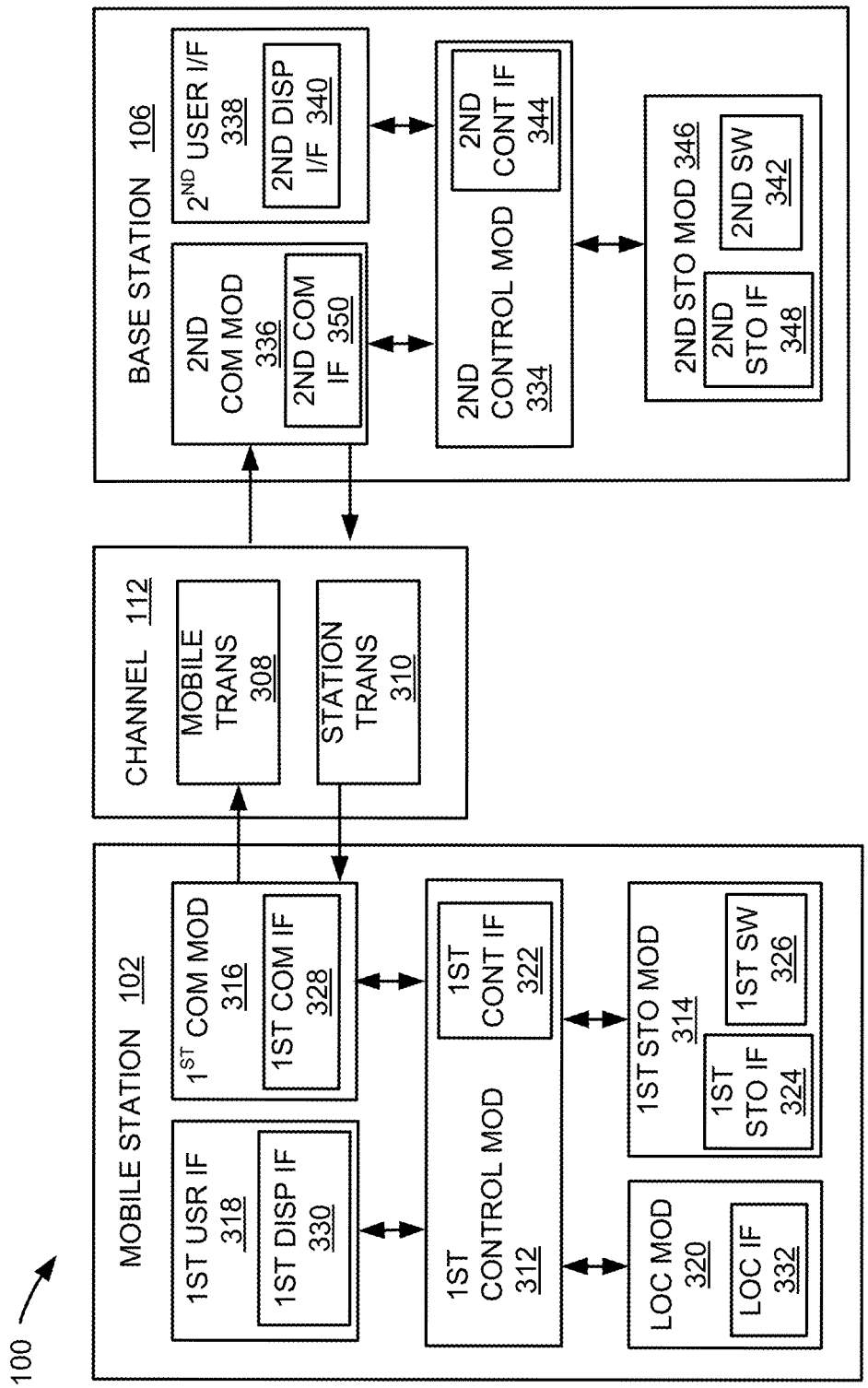
FIG. 3 is an exemplary block diagram of the wireless communication system.

Referring now to FIG. 3, therein is shown an exemplary block diagram of the communication system 100. The communication system 100 can include the mobile device 102, the network 104, and the base station 106. The mobile device 102 can send information in a mobile transmission 308 over the network 104 to the base station 106. The base station 106 can send information in a base transmission 310 over the network 104 to the mobile device 102.

For illustrative purposes, the communication system 100 is shown with the mobile device 102 as a client device, although it is understood that the communication system 100 can have the mobile device 102 as a different type of device. For example, the mobile device 102 can be a server having a display interface.

Also for illustrative purposes, the communication system 100 is shown with the base station 106 as a server, although it is understood that the communication system 100 can have the base station 106 as a different type of device. For example, the base station 106 can be a client device.

For brevity of description in this embodiment of the present invention, the mobile device 102 will be described as a client device and the base station 106 will be described as a server device. The embodiment of the present invention is not limited to this selection for the type of devices. The selection is an example of the embodiment of the present invention.

The mobile device 102 can include a first control module 312, a first storage module 314, a first communication module 316, and a first user interface 318. The first control module 312 can include a first control interface 322. The first control module 312 can execute a first software 326 to provide the intelligence of the communication system 100.

The first control module 312 can be implemented in a number of different manners. For example, the first control module 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control module 312 and other functional modules in the mobile device 102. The first control interface 322 can also be used for communication that is external to the mobile device 102.

The first control interface 322 can receive information from the other functional modules or from external sources, or can transmit information to the other functional modules or to external destinations. The external sources and the external destinations refer to sources and destinations external to the mobile device 102.

The first control interface 322 can be implemented in different ways and can include different implementations depending on which functional modules or external modules are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage module 314 can store the first software 326. The first storage module 314 can also store the relevant information, such as data representing incoming images, data representing previously presented image, sound files, or a combination thereof.

The first storage module 314 can be a volatile memory, a nonvolatile memory, an internal memory, an external memory, or a combination thereof. For example, the first storage module 314 can be a nonvolatile storage such as non-volatile random access memory (NVRAM), Flash memory, disk storage, or a volatile storage such as static random access memory (SRAM).

The first storage module 314 can include a first storage interface 324. The first storage interface 324 can be used for communication between and other functional modules in the mobile device 102. The first storage interface 324 can also be used for communication that is external to the mobile device 102.

The first storage interface 324 can receive information from the other functional modules or from external sources, or can transmit information to the other functional modules or to external destinations. The external sources and the external destinations refer to sources and destinations external to the mobile device 102.

The first storage interface 324 can include different implementations depending on which functional modules or external modules are being interfaced with the first storage module 314. The first storage interface 324 can be implemented with technologies and techniques similar to the implementation of the first control interface 322.

The first communication module 316 can enable external communication to and from the mobile device 102. For example, the first communication module 316 can permit the mobile device 102 to communicate with the base station 106 of FIG. 1, an attachment, such as a peripheral device or a computer desktop, and the network 104.

The first communication module 316 can also function as a communication hub allowing the mobile device 102 to function as part of the network 104 and not limited to be an end point or terminal module to the network 104. The first communication module 316 can include active and passive components, such as microelectronics or an antenna, for interaction with the network 104.

The first communication module 316 can include a first communication interface 328. The first communication interface 328 can be used for communication between the first communication module 316 and other functional modules in the mobile device 102. The first communication interface 328 can receive information from the other functional modules or can transmit information to the other functional modules.

The first communication interface 328 can include different implementations depending on which functional modules are being interfaced with the first communication module 316. The first communication interface 328 can be implemented with technologies and techniques similar to the implementation of the first control interface 322.

The first user interface 318 allows a user (not shown) to interface and interact with the mobile device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control module 312 can operate the first user interface 318 to display information generated by the communication system 100. The first control module 312 can also execute the first software 326 for the other functions of the communication system 100. The first control module 312 can further execute the first software 326 for interaction with the network 104 via the first communication module 316.

The base station 106 can be optimized for implementing the embodiment of the present invention in a multiple device embodiment with the mobile device 102. The base station 106 can provide the additional or higher performance processing power compared to the mobile device 102. The base station 106 can include a second control module 334, a second communication module 336, and a second user interface 338.

The second user interface 338 allows a user (not shown) to interface and interact with the base station 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control module 334 can execute a second software 342 to provide the intelligence of the base station 106 of the communication system 100. The second software 342 can operate in conjunction with the first software 326. The second control module 334 can provide additional performance compared to the first control module 312.

The second control module 334 can operate the second user interface 338 to display information. The second control module 334 can also execute the second software 342 for the other functions of the communication system 100, including operating the second communication module 336 to communicate with the mobile device 102 over the network 104.

The second control module 334 can be implemented in a number of different manners. For example, the second control module 334 can be a processor, an embedded processor, a microprocessor, hardware control logic, a hardware finite state machine (FSM), a digital signal processor (DSP), or a combination thereof.

The second control module 334 can include a second controller interface 344. The second controller interface 344 can be used for communication between the second control module 334 and other functional modules in the base station 106. The second controller interface 344 can also be used for communication that is external to the base station 106.

The second controller interface 344 can receive information from the other functional modules or from external sources, or can transmit information to the other functional modules or to external destinations. The external sources and the external destinations refer to sources and destinations external to the base station 106.

The second controller interface 344 can be implemented in different ways and can include different implementations depending on which functional modules or external modules are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage module 346 can store the second software 342. The second storage module 346 can also store the such as data representing incoming images, data representing previously presented image, sound files, or a combination thereof. The second storage module 346 can be sized to provide the additional storage capacity to supplement the first storage module 314.

For illustrative purposes, the second storage module 346 is shown as a single element, although it is understood that the second storage module 346 can be a distribution of storage elements. Also for illustrative purposes, the communication system 100 is shown with the second storage module 346 as a single hierarchy storage system, although it is understood that the communication system 100 can have the second storage module 346 in a different configuration. For example, the second storage module 346 can be formed with different storage technologies forming a memory hierarchal system including different levels of caching, main memory, rotating media, or off-line storage.

The second storage module 346 can be a volatile memory, a nonvolatile memory, an internal memory, an external memory, or a combination thereof. For example, the second storage module 346 can be a nonvolatile storage such as non-volatile random access memory (NVRAM), Flash memory, disk storage, or a volatile storage such as static random access memory (SRAM).

The second storage module 346 can include a second storage interface 348. The second storage interface 348 can be used for communication between other functional modules in the base station 106. The second storage interface 348 can also be used for communication that is external to the base station 106.

The second storage interface 348 can receive information from the other functional modules or from external sources, or can transmit information to the other functional modules or to external destinations. The external sources and the external destinations refer to sources and destinations external to the base station 106.

The second storage interface 348 can include different implementations depending on which functional modules or external modules are being interfaced with the second storage module 346. The second storage interface 348 can be implemented with technologies and techniques similar to the implementation of the second controller interface 344.

The second communication module 336 can enable external communication to and from the base station 106. For example, the second communication module 336 can permit the base station 106 to communicate with the mobile device 102 over the network 104.

The second communication module 336 can also function as a communication hub allowing the base station 106 to function as part of the network 104 and not limited to be an end point or terminal module to the network 104. The second communication module 336 can include active and passive components, such as microelectronics or an antenna, for interaction with the network 104.

The second communication module 336 can include a second communication interface 350. The second communication interface 350 can be used for communication between the second communication module 336 and other functional modules in the base station 106. The second communication interface 350 can receive information from the other functional modules or can transmit information to the other functional modules.

The second communication interface 350 can include different implementations depending on which functional modules are being interfaced with the second communication module 336. The second communication interface 350 can be implemented with technologies and techniques similar to the implementation of the second controller interface 344.

The first communication module 316 can couple with the network 104 to send information to the base station 106 in the mobile transmission 308. The base station 106 can receive information in the second communication module 336 from the mobile transmission 308 of the network 104.

The second communication module 336 can couple with the network 104 to send information to the mobile device 102 in the base transmission 310. The mobile device 102 can receive information in the first communication module 316 from the base transmission 310 of the network 104. The communication system 100 can be executed by the first control module 312, the second control module 334, or a combination thereof. For illustrative purposes, the base station 106 is shown with the partition having the second user interface 338, the second storage module 346, the second control module 334, and the second communication module 336, although it is understood that the base station 106 can have a different partition. For example, the second software 342 can be partitioned differently such that some or all of its function can be in the second control module 334 and the second communication module 336. Also, the base station 106 can include other functional modules not shown in FIG. 3 for clarity.

The functional modules in the mobile device 102 can work individually and independently of the other functional modules. The mobile device 102 can work individually and independently from the base station 106 and the network 104.

The functional modules in the base station 106 can work individually and independently of the other functional modules. The base station 106 can work individually and independently from the mobile device 102 and the network 104.

For illustrative purposes, the communication system 100 is described by operation of the mobile device 102 and the base station 106. It is understood that the mobile device 102 and the base station 106 can operate any of the modules and functions of the communication system 100.

The modules described in this application can be hardware implementation or hardware accelerators in the first control module 312 or in the second control module 334. The modules can also be hardware implementation or hardware accelerators within the first device 102 or the second device 106 but outside of the first control module 312 or the second control module 334, respectively.

Figure 4:
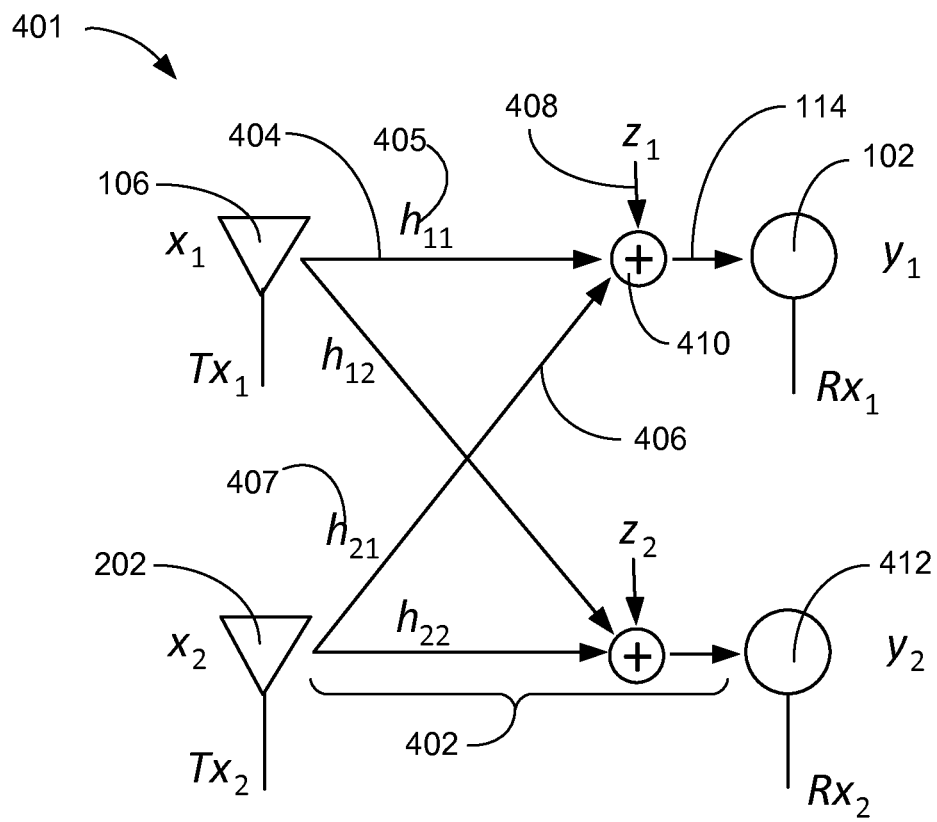
FIG. 4 is a schematic view of a point-to-point communication of the wireless communication system.

Referring now to FIG. 4, therein is shown a schematic view of communication environment 401 of the wireless communication system 100. As an example, the schematic view of the interference communication environment 401 depicts the mobile device 102 in direct communication with the base station 106, such as a single-input single-output network (SISO) communicating through a Gaussian interference channel (GIC).

A communication channel 402 can modify a desired communication 404, such as the desired input signal 112, from the base station 106 and an interference communication 406 from the alternative base station 202 in a substantially similar manner. The physical nature of the communication channel 402 cannot change within the duration of a single event of the desired communication 404, which allows the identification and elimination of the interference communication 406.

An additive white Gaussian noise (AWGN) 408 is added to the arriving communication 114 as if it were combined by an adder 410. It is understood that the desired communication 404 and the interference communication 406 are combined within the communication channel 402. The adder 410 exemplifies the combining of the desired communication 404, the interference communication 406, and the AWGN 408.

The interference communication 406 can be generated when the alternative base station 202 is actively communicating with a further mobile device 412. During the normal communication between the alternative base station 202 and the alternative mobile device 412, the transmission from the alternative base station 202 presents the interference communication 406 to the mobile device 102.

The arriving communication 114 can be represented in the form of an equation as:

$$y_1 = h_{11}x_1 + h_{21}x_2 + z_1 \qquad (1)$$

Where $y_1$ represents the arriving communication 114, $h_{ij}$ can be a complex scalar representing the effects of the communication channel 402, $x_i$ represents the desired input signal 112 of FIG. 1 from one of the base stations, and $z_i$ represent a circularly symmetric complex Gaussian noise distribution with zero mean and module variance such as the AWGN 408 in the area of the mobile device 102. The effects of the communication channel 402 include a first effect 405, represented as '$h_{11}$', and a second effect 407, represented as '$h_{21}$'. The first effect 405 corresponds to the desired communication 404 and the second effect 407 corresponds to the interference communication 406. It is understood that the equation of the arriving communication 114 is generalized to represent any instance of the mobile device 102 that might operate within the wireless communication system 100.

In order for the mobile device 102 to make use of the desired communication 404, the arriving communication 114 must be filtered to remove or minimize the effects of the communication channel 402, the interference communication 406, and the AWGN 408. By way of an example, only one additional instance of the mobile device 102 is considered in the point-to-point communication 401, but it is understood that any number of the additional instances of the mobile device 102 can be communicating concurrently.

Figure 5:
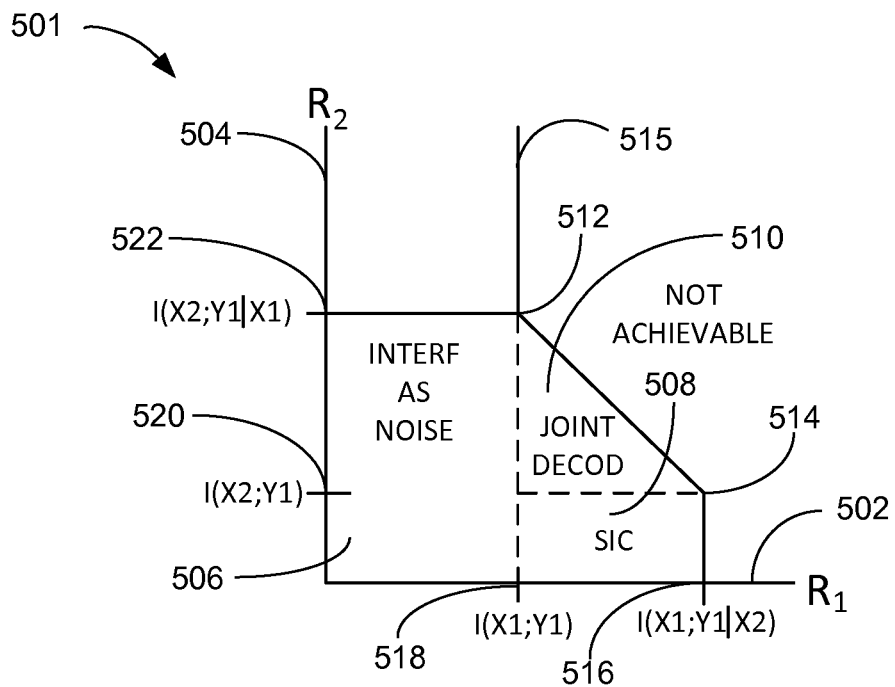
FIG. 5 is an exemplary diagram of a capacity region of the wireless communication system.

Referring now to FIG. 5, therein is shown an exemplary diagram of a capacity region 501 of the wireless communication system 100. The exemplary diagram of the capacity region 501 depicts a mobile device symbol rate 502, such as a range of possible point-to-point codes that can be transmitted from the base station 106 of FIG. 1 to the mobile device 102 of FIG. 1, and a alternative mobile device symbol rate 504, such as the range of the possible point-to-point codes that can be interference codes transmitted from the alternative base station 202 of FIG. 2 to the alternative mobile device 412 of FIG. 4.

The capacity region 501 represents the limits of the range of all of the possible instances of the point-to-point codes that can deliver the desired communication 404 of FIG. 4 to the mobile device 102. The first communication interface 328 of FIG. 3 can include a receiver (not shown) capable of joint decoding of the arriving communication 114 of FIG. 1. The first communication interface 328 is coupled to the first control module 312 of FIG. 3 for performing the calculations associated with generating the capacity region 501.

The capacity region 501 can determine the range of symbol rates represented by the mobile device symbol rate 502, as displayed along the x-axis and increasing to the right, and the alternative mobile device symbol rate 504, as displayed on the y-axis and increasing in an upwardly direction. The two dimensional nature of the capacity region 501 reflects that the alternative mobile device symbol rate 504 acts as an interference source for the mobile device symbol rate 502 and vice versa.

The capacity region 501 can include an interference range 506, a successive interference cancellation (SIC) range 508, and a joint decode range 510. The interference range 506 can be a range of symbol rates that can be filtered by treating the alternative mobile device symbol rate 504 as noise to remove the interference communication 406 of FIG. 4. The successive interference cancellation (SIC) range 508 can be the range of symbol rates that can be filtered by successive interference cancellation (SIC) to remove the interference communication 406. The joint decode range 510 can be the range of symbol rates that must be filtered by joint decoding to remove the interference communication 406. The range of symbol rates included in the interference range 506, the SIC range 508, and the joint decode range 510 are able to be processed in order to achieve a block error rate (BLER), that meets the specification of the global system for mobile-communication (GSM), for communication by the wireless communication system 100 of FIG. 1. All of the symbol rates that are outside the capacity region 501 defined by the interference range 506, the SIC range 508, and joint decode range 510 are unable to meet the specification of the global system for mobile-communication (GSM) for BLER and should not be used.

It is understood that the capacity region 501 as depicted is referenced to the decoding of the mobile device symbol rate 502. A first inflection point 512 marks the junction of the interference range 506 and the joint decode range 510 at the limit of the acceptable BLER. Due to the nature of the transmission, a line with slope of −1 can determine a second inflection point 514. The line defining the limit of the capacity region 501 can be defined as a function of the signal-to-noise ratio (SNR) for the mobile device symbol rate 502 and relationship of the mobile device symbol rate 502 to the BLER is able to be determined.

A normalized SNR ($SNR_{norm}$) can be defined as:

$$SNR_{norm} = P/(2^R - 1) \quad (2)$$

Where P is defined to be the signal-to-noise ratio (SNR) for the mobile device symbol rate 502 and R is the code rate for the mobile device symbol rate 502. It is understood that the code rate is different from the symbol rate based on the type of coding applied to the mobile device symbol rate 502.

The channel can be assumed to be a point-to-point additive white Gaussian noise (AWGN) channel given by:

$$y = x + z \quad (3)$$

Where y is the arriving communication 114, x is the desired input signal 112 of FIG. 1, and z is a circularly symmetric complex Gaussian with zero mean and unit variance. In this case, the capacity region 501 can be calculated as:

$$\text{The capacity region } 501 = \log_2(1 + P) \quad (4)$$

Then, for optimal code, $SNR_{norm} = 1$ which is the lower bound of the range of the $SNR_{norm}$. For a sub-optimal code, $SNR_{norm}$ can be specified for a given value of the mobile device symbol rate 502 and the target value of the BLER.

By way of an example, $SNR_{norm}$ can be 8.4 deci-Bells (dB) when BLER=$10^{-5}$ for an uncoded M-QAM transmission. This means that $SNR_{norm}$ is independent of R for uncoded M-QAM. $SNR_{norm}$ can also be found for coded system, and it typically depends on the value of the mobile device symbol rate 502 as well as BLER.

Given the point-to-point code rate-error relationship between the BLER and the R, such as the mobile device symbol rate 502 for a given P, the value of R can be determined for the target value of the BLER. The value of R can be calculated by:

$$R = \log_2(1 + P/SNR_{norm}) \quad (5)$$

Hence, for any P which supports communication with rate R and specific BLER can be found by using $SNR_{norm}$. This also means that, when two of P, R, BLER are given, the other can be found for a certain type of code. A point-to-point code rate-error boundary 515 marks the relationship between R and BLER for given P with a certain type of code. The point-to-point code rate-error boundary 515 marks the balance of the relationship of the point-to-point code rate and the acceptable block error rate to maximize the rate R. The solution of R can be generalized by:

$$R = f(P, BLER) \quad (6)$$

Where the point-to-point rate function $f$ depends on a code type, such as 4 quadrature amplitude modulation (QAM), 16 QAM, or 64 QAM, and it determines the rate R of a code block which supports BLER when SNR is P. The point-to-point code rate-error boundary 515 can be applied to calculate four points of interest including a first R1 reference 516, which can be achieved by successive interference cancellation (SIC) of the alternative mobile device symbol rate 504 that acts as an interference source. A second R1 reference 518, which represents the highest symbol rate for the mobile device 102 of FIG. 1 that can remove the effects of the alternative mobile device symbol rate 504 by treating it as noise. A first R2 reference 520, which is the transition point where the effects of alternative mobile device symbol rate 504 above the first R2 reference 520 can no longer be removed by successive interference cancellation (SIC). The combination of the first R1 reference 516 and the first R2 reference 520 can determine the second inflection point 514. The relationship of the first inflection point 512 to the second inflection point 514 can be combined with the second R1 reference 518 to determine the second R2 reference 522.

In order to locate the first R1 reference 516 and the first R2 reference 520, one can recognize that the first R2 reference 520 is equal to the point-to-point capacity with the alternative mobile device symbol rate 504 treated as noise and the first R1 reference 516 is equal to the point-to-point capacity with the alternative mobile device symbol rate 504 completely removed. With this understanding it can be shown that:

$$P_1 = |h_{11}|^2 E[|X_1|^2] \quad (7)$$

And $$P_2 = |h_{21}|^2 E[|X_2|^2] \quad (8)$$

Where $X_1$ represents the desired input signal 112 in the arriving communication 114, $X_2$ represents the interference communication 406 in the arriving communication 114, $h_{ij}$ can be a complex scalar representing the effects of the communication channel 402 of FIG. 4. Then the first R1 reference 516 can be calculated by setting a first SNR for the first R1 reference 516 as a first parameter $P_1$ according to equation (7), as represented by 'First SNR=$P_1$'. A second SNR for the first R2 reference 520 can be calculated using the first parameter $P_1$ and a second parameter $P_2$ according to equation (8), according to:

$$\text{Second SNR} = P_2/(P_1 + 1) \quad (9)$$

The resultant values can be manipulated by the point-to-point code rate-error boundary 515 based on the point-to-point function '$f$' of equation (6) above given the value of the target BLER, and calculating the first SNR for the first R1 reference 516 along with the second SNR for the first R2 reference 520 to determine the first R1 reference 516 and the first R2 reference 520. The combination of these points can determine the second inflection point 514. Similarly, the second R2 reference 522 can be calculated by setting the second SNR to the second parameter, as represented by 'Second SNR=$P_2$'. The first SNR can be calculated using the first parameter and $P_1$ and the second parameter $P_2$, according to:

$$\text{First SNR} = P_1/(P_2 + 1)$$

The resultant values can be manipulated by the point-to-point code rate-error boundary 515 based on the point-to-point function $f$ of equation (6) above given the value of the target BLER, and calculating the first SNR and the second SNR to determine the second R1 reference 518 and the second R2 reference 522. The combination of these points can determine the first inflection point 512.

The shape of the capacity region 501 is assumed to be constant, while the positions of the first inflection point 512 and the second inflection point 514 are dependent on the code type used. The line between the first inflection point 512 and the second inflection point 514 must have a slope of −1 in all circumstances. In order to calculate the positions of the first inflection point 512 and the second inflection point 514, any three of the first R1 reference 516, the second R1 reference 518, the first R2 reference 520, and the second R2 reference 522 can be calculated based on the point-to-point code rate-error boundary 515.

It has been discovered that a range of modulation can be represented by a capacity region 501 based on the point-to-point code rate-error relationship. The calculation of the first inflection point 512 and the second inflection point 514 for any of the capacity region 501 can be performed by calculating only three of the points of interest with the use of a look-up table having only two parameters. The capacity region 501 can be defined by the second inflection point 514 and the first inflection point 512, which identify the boundary between the achievable frequency ranges and those that are not achievable within the target block error rate (BLER). The line between the first inflection point 512 and the second inflection point 514 must have a slope of −1 in all circumstances. The calculations of any three of the first R1 reference 516, the second R1 reference 518, the first R2 reference 520, and the second R2 reference 522, representing the point-to-point code rate-error boundary 515, can be performed in real time and do not require any update that is normal with a look-up table. Based on the capacity region 501 and the point-to-point code rate-error relationship a value for R1 can be determined given the R2 value.

In the capacity region 501, the first R2 reference 520 can be $I(X_1;Y_1)$ and the second R2 reference 522 can be $I(X_2;Y_1|X_1)$. Note that the second R1 reference 518, which is $I(X_1;Y_1)$ can be achieved by treating the interference from the alternative mobile device symbol rate 504 as noise. When the rate of interference is larger than the second R2 reference 522, then non-zero BLER decoding of interference is impossible, and hence, treating interference as noise is the best in this portion of the capacity region 501. In practical system, we are allowing non-zero BLER, and hence, interference with the rate greater than the second R2 reference 522 does not need to be completely treated as noise. Hence, the second R1 reference 518 can be under-estimating the achievable rate with interference rate greater than the second R2 reference 522, and the actual achievable region would not have straight vertical line from the second R1 reference 518 to infinity.

It has been discovered that the embodiment of the wireless communication system 100 can be implemented using three modulations of 4 QAM (QPSK), 16 QAM, 64 QAM, and uses a specific modulation for certain range of the data rate. Based on a specific block error rate (BLER) and channel, the function $f$ depends on the code type, such as 4 quadrature amplitude modulation (QAM), 16 QAM, or 64 QAM, and it determines the rate R of a code block which supports the BLER. The mobile device symbol rate 502 can be determined based on a given value of the alternative mobile device symbol rate 504. If the alternative mobile device symbol rate 504 is greater than the second R2 reference 522, then a temporary value of the mobile device symbol rate 502 is set to the second R1 reference 518. Or if the alternative mobile device symbol rate 504 is greater than the first R2 reference 520 plus the second R2 reference 522 minus the first R1 reference 516, then the temporary value of the mobile device symbol rate 502 is set to the first R2 reference 520 plus the second R2 reference 522 minus the alternative mobile device symbol rate 504. Or the temporary value of the mobile device symbol rate 502 is set to the first R1 reference 516. The temporary value of the mobile device symbol rate 502 can be compared to the values in table 1 to determine the value.

TABLE 1 of mobile device symbol rates

| Modulation | Rate |
| --- | --- |
| QPSK | 0.1523 |
| QPSK | 0.2344 |
| QPSK | 0.3770 |
| QPSK | 0.6016 |
| QPSK | 0.8770 |
| QPSK | 1.1758 |
| 16QAM | 1.4766 |
| 16QAM | 1.9141 |
| 16QAM | 2.4063 |
| 64QAM | 2.7305 |
| 64QAM | 3.3223 |
| 64QAM | 3.9023 |
| 64QAM | 4.5234 |
| 64QAM | 5.1152 |
| 64QAM | 5.5547 |

Figure 6:
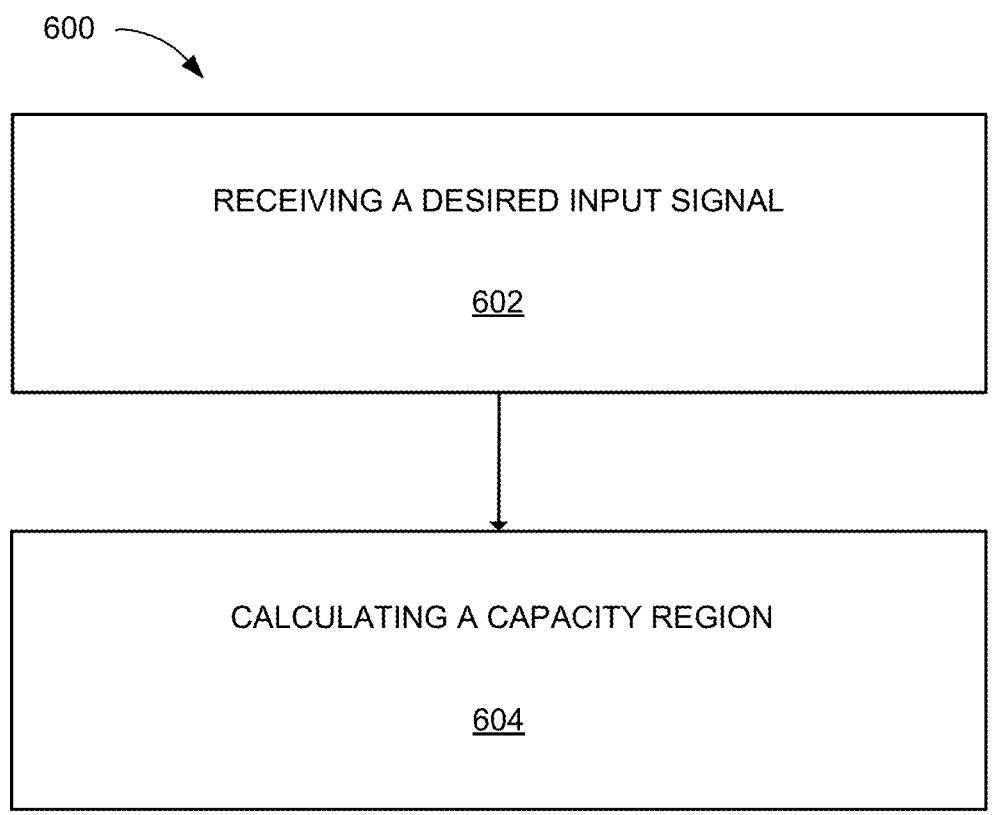
FIG. 6 a flow chart of a method of operation of a wireless communication system in an embodiment of the present invention.

Referring now to FIG. 6, therein is shown a flow chart of a method 600 of operation of a wireless communication system 100 in an embodiment of the present invention. The method 600 includes: a communication interface configured to receive a desired input signal and an interference input signal in a block 602; and a control module, coupled to the communication interface, configured to calculate a capacity region to maximize a first R1 reference for the desired input signal by removing the interference input signal in a block 604.

The embodiment of the present invention provides that a range of modulation can be represented by a capacity region 501 based on the point-to-point code rate-error relationship. The capacity region 501 can be defined by the second inflection point 514 and the first inflection point 512, which identify the boundary between the achievable frequency ranges and those that are not achievable within the target block error rate (BLER). The calculation of the first inflection point 512 and the second inflection point 514, by the first control module 312, for any of the capacity region 501 can be performed by calculating only three of the points of interest with the use of a look-up table having only two parameters. The calculations of any three of the first R1 reference 516, the second R1 reference 518, the first R2 reference 520, and the second R2 reference 522, representing the point-to-point code rate-error boundary 515, can be performed in real time and do not require any update that is normal with a look-up table.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A wireless communication system comprising:
a communication interface configured to receive a desired input signal and an interference input at an alternative mobile device symbol rate;
a control module, coupled to the communication interface, configured to; calculate a capacity region based on:
a first parameter calculated using a first effect and the desired input signal,
a second parameter calculated using a second effect and the interference input signal, a first inflection point and a second inflection point calculated for the capacity region using the first parameter and the second parameter with a point-to-point rate function $f$ of block-error rate for representing point-to-point communication without the interference input signal, and determine a mobile device symbol rate for the desired input signal according to the capacity region with the alternative mobile device symbol rate for the interference input signal.

2. The system as claimed in claim 1 wherein the control module is configured to:
set a first signal-to-noise ratio to the first parameter;
calculate a second signal-to-ratio based on the first parameter and the second parameter; and
calculate the second inflection point based on inputting the first signal-to-noise ratio and the second signal-to-noise ratio to the point-to-point rate function.

3. The system as claimed in claim 1 wherein the control module is configured to:
set a second signal-to-noise ratio to the second parameter;
calculate a first signal-to-noise ratio based on the first parameter and the second parameter; and
calculate the first inflection point based on inputting the first signal-to-noise ratio and the second signal-to-noise ratio to the point-to-point rate function.

4. The system as claimed in claim 1 further comprising a storage module, coupled to the control module, configured to store a point-to-point code rate-error boundary.

5. The system as claimed in claim 1 wherein the control module, coupled to a storage module, configured to calculate only three of a first R1 reference, a second R1 reference, a first R2 reference, and a second R2 reference.

6. A method of operation of a wireless communication system comprising:
receiving a desired input signal and an interference input signal at an alternative mobile device symbol rate;
calculating a capacity region, by a control module, based on:
a first parameter calculated using a first effect and the desired input signal,
a second parameter calculated using a second effect and the interference input signal,
a first inflection point and a second inflection point calculated for the capacity region using the first parameter and the second parameter with a point-to-point rate function $f$ of block-error rate for representing point-to-point communication without the interference input signal, and
determining a mobile device symbol rate for the desired input signal according to the capacity region with the alternative mobile device symbol rate for the interference input signal.

7. The method as claimed in claim 6 further comprising:
setting a first signal-to-noise ratio to the first parameter;
calculating a second signal-to-ratio based on the first parameter and the second parameter; and
calculating the second inflection point based on inputting the first signal-to-noise ratio and the second signal-to-noise ratio to the point-to-point rate function.

8. The method as claimed in claim 6 further comprising:
set a second signal-to-noise ratio to the second parameter;
calculating a first signal-to-noise ratio based on the first parameter and the second parameter; and
calculating the first inflection point based on inputting the first signal-to-noise ratio and the second signal-to-noise ratio to the point-to-point rate function.

9. The method as claimed in claim 6 further comprising calculating a point-to-point code rate-error boundary including the second inflection point and the first inflection point.

10. The method as claimed in claim 6 wherein calculating the capacity region includes calculating only three of a first R1 reference, a second R1 reference, a first R2 reference, and a second R2 reference.

11. A wireless communication system comprising:
a communication interface configured to receive a desired input signal from a base station and an interference input signal from an alternative base station at an alternative mobile device symbol rate;
a control module, coupled to the communication interface, configured to: calculate a capacity region based on:
a first parameter calculated using a first effect and the desired input signal,
a second parameter calculated using a second effect and the interference input signal,
a first inflection point, including a second R1 reference and a second R2 reference, and a second inflection point, including a first R1 reference and a first R2 reference, using the first parameter and the second parameter with a point-to-point rate function $f$ of block-error rate for representing point-to-point communication without the interference input signal, and
determine a mobile device symbol rate for the desired input signal according to the capacity region with the alternative mobile device symbol rate for the interference input signal.

12. The system as claimed in claim 11 wherein the control module is configured to determine the mobile device symbol rate based on the second R1 reference when the alternative mobile device symbol rate is greater than the second R2 reference.

13. The system as claimed in claim 11 wherein the control module is configured to determine the mobile device symbol rate based on a combination of the second R1 reference, the second R2 reference, and the alternative mobile device symbol rate when the alternative mobile device symbol rate is greater than a combination of the second R1 reference, the second R2 reference, and the first R1 reference.

14. The system as claimed in claim 11 further comprising a storage module, coupled to the control module, configured to store a point-to-point code rate-error boundary includes the control module configured to calculate $SNR_{norm}$ from the mobile device symbol rate, a channel estimate, and the block error rate.

15. The system as claimed in claim 11 wherein the control module is configured to calculate only three of a first R1 reference, a second R1 reference, a first R2 reference, and a second R2 reference based on calculating a device symbol rate, from a signal-to-noise ratio (SNR) and the block error rate (BLER), for each of the first R1 reference, the second R1 reference, the first R2 reference, and the second R2 reference.

16. The system as claimed in claim 11 wherein the control module is configured to determine the mobile device symbol rate based on the first R1 reference when the alternative mobile device symbol rate is less than or equal to the second R2 reference, and less than or equal to a combination of the second R1 reference, the second R2 reference, and the first R1 reference.

17. The system as claimed in claim 11 wherein the control module is configured to calculate the capacity region using the point-to-point rate function $f$ based on a code type.

18. The system as claimed in claim 11 wherein the control module is configured to calculate the capacity region using the point-to-point rate function $f$ for determining the first R1 reference, the second R1 reference, the first R2 reference, the second R2 reference, or a combination thereof supporting the block error rate.

19. The system as claimed in claim 11 wherein the control module is configured to calculate $SNR_{norm}$ from the mobile device symbol rate, a channel estimate, and the block error rate.

20. The system as claimed in claim 11 wherein the control module is configured to calculate a device symbol rate, from a signal-to-noise ratio (SNR) and the block error rate (BLER), for each of the first R1 reference, the second R1 reference, the first R2 reference, and the second R2 reference.

* * * * *